US012610985B2

(12) United States Patent
Lu et al.

(10) Patent No.: US 12,610,985 B2
(45) Date of Patent: Apr. 28, 2026

(54) AEROSOL-GENERATION DEVICE

(71) Applicant: SHENZHEN FIRST UNION TECHNOLOGY CO., LTD., Shenzhen (CN)

(72) Inventors: Zhiming Lu, Shenzhen (CN); Ruilong Hu, Shenzhen (CN); Yinzhe Li, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 364 days.

(21) Appl. No.: 18/035,288

(22) PCT Filed: Nov. 3, 2021

(86) PCT No.: PCT/CN2021/128439
§ 371 (c)(1),
(2) Date: May 3, 2023

(87) PCT Pub. No.: WO2022/095899
PCT Pub. Date: May 12, 2022

(65) Prior Publication Data
US 2024/0008539 A1 Jan. 11, 2024

(30) Foreign Application Priority Data
Nov. 3, 2020 (CN) .......................... 202022498844.7

(51) Int. Cl.
A24F 40/46 (2020.01)
F16L 59/07 (2006.01)
H05B 3/00 (2006.01)

(52) U.S. Cl.
CPC .............. *A24F 40/46* (2020.01); *F16L 59/07* (2013.01); *H05B 3/0038* (2013.01)

(58) Field of Classification Search
CPC .......... A24F 40/00; A24F 40/10; A24F 40/20; A24F 40/40; A24F 40/46
See application file for complete search history.

(56) References Cited

U.S. PATENT DOCUMENTS

2015/0181934 A1 7/2015 Lyubomirskiy et al.

FOREIGN PATENT DOCUMENTS

CA 3131787 A1 9/2020
CN 104039179 A 9/2014
(Continued)

*Primary Examiner* — Cedrick S Williams
(74) *Attorney, Agent, or Firm* — Cheng-Ju Chiang

(57) ABSTRACT

An aerosol-generation device includes a cavity, configured to receive an aerosol-forming substrate; a heater, configured to heat the aerosol-forming substrate received in the cavity; a heat insulation tube, arranged outside the heater, where the heat insulation tube has an inner tube and an outer tube that are arranged along a radial direction of the cavity, and a sealing space is formed between the inner tube and the outer tube; and the sealing space is filled with gas; and a heat insulation layer, arranged between the heater and the heat insulation tube. In this application, the heat insulation layer can reduce radiant heat transfer of the heater, and the heat insulation tube arranged outside the heater can further prevent the heat from being transferred outward, thereby preventing a user from feeling hot due to a high shell temperature of the aerosol-generation device, and improving user experience.

19 Claims, 7 Drawing Sheets

(56)        References Cited

FOREIGN PATENT DOCUMENTS

| | | | | |
|---|---|---|---|---|
| CN | 206586396 U | * | 10/2017 | |
| CN | 207754539 U | * | 8/2018 | |
| CN | 208030265 U | | 11/2018 | |
| CN | 109330030 A | | 2/2019 | |
| CN | 109674095 A | * | 4/2019 | .......... A24F 47/008 |
| CN | 109846093 A | | 6/2019 | |
| CN | 110617383 A | | 12/2019 | |
| CN | 110881695 A | | 3/2020 | |
| CN | 210484841 U | | 5/2020 | |
| JP | 2001-326060 A | | 11/2001 | |
| JP | 2007-15118 A | | 1/2007 | |
| JP | 2018-529324 A | | 10/2018 | |
| WO | 2020/074601 A1 | | 4/2020 | |

* cited by examiner

100

AEROSOL-GENERATION DEVICE

CROSS-REFERENCE TO RELATED APPLICATIONS

This application is a 35 U.S.C. § 371 National Phase conversion of International (PCT) Patent Application No. PCT/CN2021/128439, filed on Nov. 3, 2021, which claims priority to Chinese Patent Application No. 202022498844.7, filed with the China National Intellectual Property Administration on Nov. 3, 2020 and entitled "AEROSOL-GENERATION DEVICE", which is incorporated herein by reference in its entirety. The PCT International Patent Application was filed and published in Chinese.

TECHNICAL FIELD

Embodiments of this application relate to the field of cigarette device technologies, and in particular, to an aerosol-generation device.

BACKGROUND

During use of smoking items such as cigarettes and cigars, tobacco is burnt to generate smoke. Attempts have been made to provide substitutes for these tobacco-burning items by producing products that release compounds without burning. An example of such a product is a so-called heat-not-burn product which releases a compound by heating instead of burning tobacco.

An existing heat-not-burn cigarette device, when being sucked, has a high shell temperature, which is easy to cause a smoker to feel hot and affects user experience. In order to avoid this problem, a vacuum tube is usually used for heat insulation, and low thermal conductivity in vacuum is used to reduce heat in the heating cavity that is transferred outward. However, due to a high vacuum degree inside the vacuum tube, a tube wall needs to bear a pressure difference between the inside and the outside. Therefore, a thickness of the tube wall of the vacuum tube is great, and the selection of a material thereof has a certain limitation.

SUMMARY

This application provides an aerosol-generation device, to resolve a problem that a high shell temperature of an existing cigarette device is easy to cause a smoker to feel hot.

This application provides an aerosol-generation device, configured to heat an aerosol-forming substrate to generate an aerosol for inhalation, and including:

a cavity, configured to receive the aerosol-forming substrate;

a heater, configured to heat the aerosol-forming substrate received in the cavity;

a heat insulation tube, arranged outside the heater, where the heat insulation tube has an inner tube and an outer tube that are arranged along a radial direction of the cavity, and a sealing space is formed between the inner tube and the outer tube; and the sealing space is filled with gas; and a heat insulation layer, arranged between the heater and the heat insulation tube.

In the aerosol-generation device provided in this application, the heat insulation layer can reduce radiant heat transfer of the heater, and the heat insulation tube arranged outside the heater can further prevent the heat from being transferred outward, thereby preventing a user from feeling hot due to a high shell temperature of the aerosol-generation device, and improving user experience.

BRIEF DESCRIPTION OF THE DRAWINGS

One or more embodiments are described by way of example with reference to the corresponding figures in the accompanying drawings, and the exemplary descriptions are not to be construed as limiting the embodiments. Elements/modules and steps in the accompanying drawings that have same reference numerals are represented as similar elements/modules and steps, and unless otherwise particularly stated, the figures in the accompanying drawings are not drawn to scale.

DETAILED DESCRIPTION

For ease of understanding of this application, this application is described in further detail below with reference to the accompanying drawings and specific implementations. It should be noted that, when an element is expressed as "being fixed to" another element, the element may be directly on the another element, or one or more intermediate elements may exist between the element and the another element. When an element is expressed as "being connected to" another element, the element may be directly connected to the another element, or one or more intermediate elements may exist between the element and the another element. The terms "upper", "lower", "left", "right", "inner", "outer", and similar expressions used in this specification are merely used for an illustrative purpose.

Unless otherwise defined, meanings of all technical and scientific terms used in this specification are the same as that usually understood by a person skilled in the technical field to which this application belongs. The terms used in this specification of this application are merely intended to describe objectives of the specific implementations, and are not intended to limit this application. The term "and/or" used in this specification includes any or all combinations of one or more related listed items.

Figure 1:
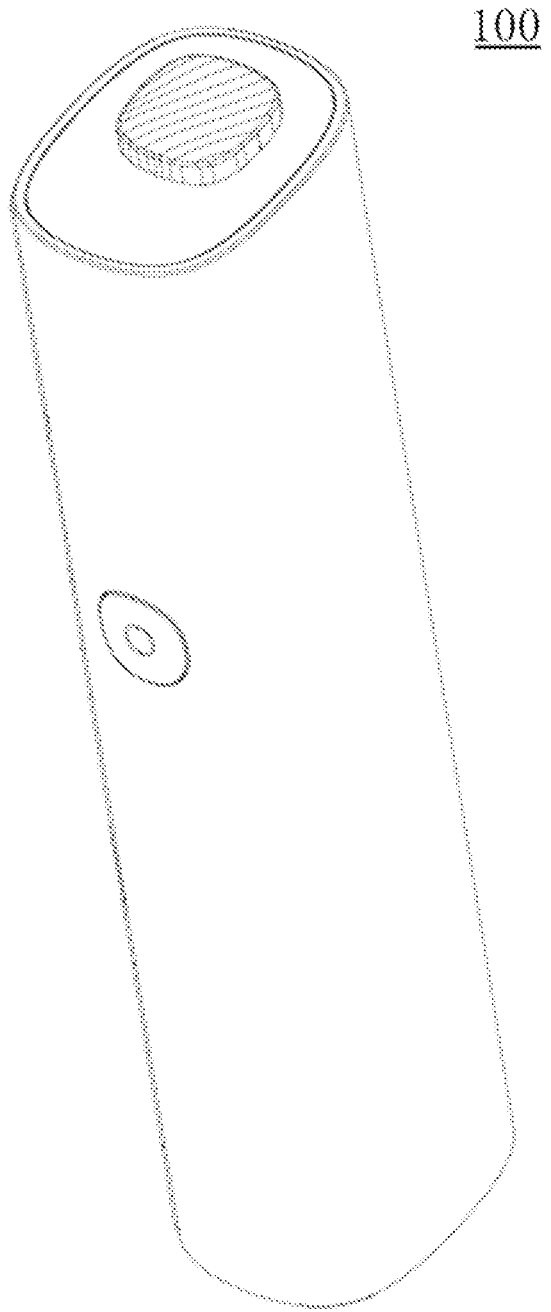
FIG. 1 is a schematic diagram of an aerosol-generation device according to an implementation of this application.
Figure 2:
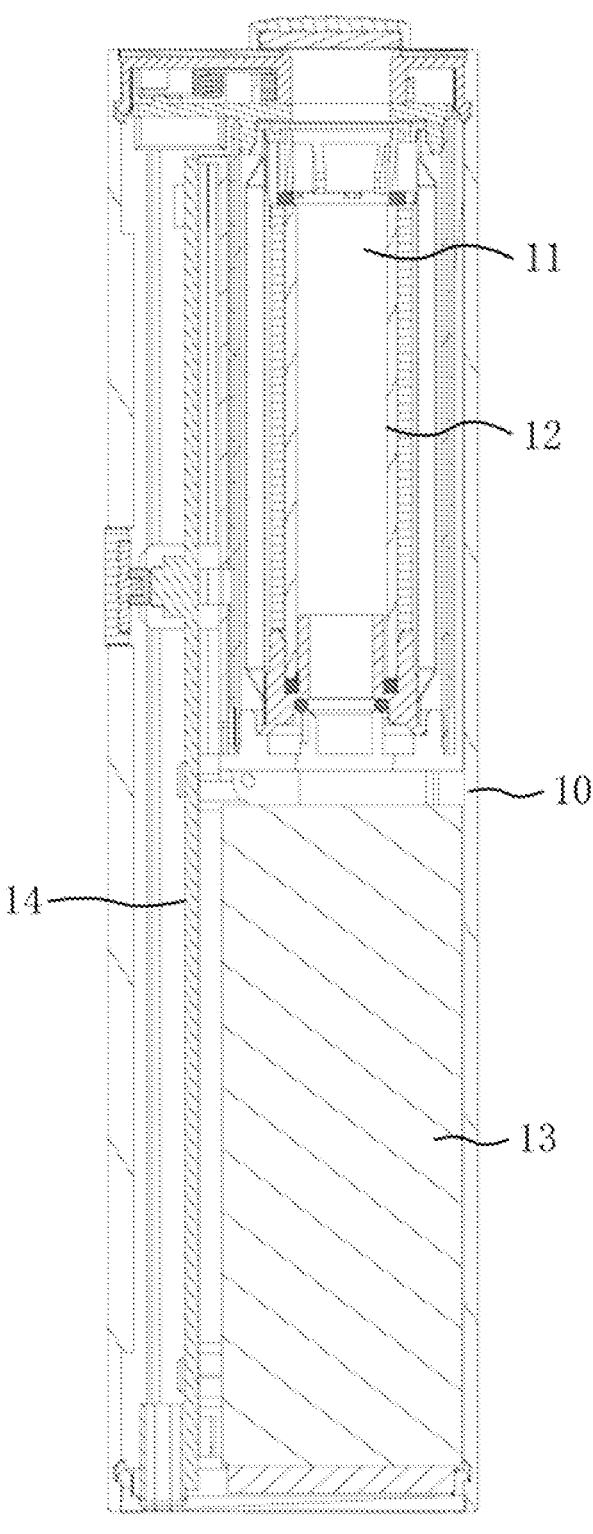
FIG. 2 is a schematic sectional view of an aerosol-generation device according to an implementation of this application.

FIG. 1 and FIG. 2 show an aerosol-generation device 100 according to an implementation of this application. The aerosol-generation device includes:

a shell 10, having a receiving space inside that may receive a heater 12, a battery cell 13, a circuit 14, and the like; and a cavity 11, configured to receive an aerosol-forming substrate, such as a cigarette.

The aerosol-forming substrate is a substrate that can release a volatile compound that can form an aerosol. The volatile compound may be released by heating the aerosol-forming substrate. The aerosol-forming substrate may be solid, or liquid, or components including solid and liquid. The aerosol-forming substrate may be loaded onto a carrier or support through adsorbing, coating, impregnating, or in other manners. The aerosol-forming substrate may conveniently be a part of the aerosol-forming article.

The aerosol-forming substrate may include nicotine. The aerosol-forming substrate may include tobacco, for example, a tobacco-containing material including a volatile tobacco aroma compound. The volatile tobacco aroma compound is released from the aerosol-forming substrate when heated. A preferred aerosol-forming substrate may include a homogeneous tobacco material. The aerosol-forming substrate may include at least one aerosol-forming agent, and the aerosol-forming agent may be any suitable known compound or a mixture of compounds. During use, the compound or the mixture of compounds facilitates and stabilizes formation of the aerosol and is substantially resistant to thermal degradation at an operating temperature of an aerosol-forming system. Suitable aerosol-forming agents are well known in the related art and include, but are not limited to: polyol, such as triethylene glycol, 1, 3-butanediol, and glycerol; ester of polyol, such as glycerol mono-, di- or triacetate; and monobasic carboxylic acid, dibasic carboxylic acid, and polybasic carboxylic acid fatty acid ester, such as dimethyl dodecane dibasic ester and dimethyl tetradecane dibasic ester. A preferred aerosol-forming agent is polyhydric alcohol or a mixture thereof, such as triethylene glycol, 1, 3-butanediol, and most preferred glycerol.

The heater 12 is configured to generate infrared rays to radiate and heat the aerosol-forming substrate received in the cavity 11.

The battery cell 13 provides power for operating the aerosol-generation device 100. For example, the battery cell 13 can provide power to heat the heater 12. In addition, the battery cell 13 can provide power required to operate other elements provided in the aerosol-generation device 100.

The battery cell 13 may be a rechargeable battery or a disposable battery. The battery cell 13 may be, but is not limited to, a lithium iron phosphate (LiFePO4) battery. For example, the battery cell 13 may be a lithium cobaltate (LiCoO2) battery or a lithium titanate battery.

The circuit 14 may control an overall operation of the aerosol-generation device 100. The circuit 14 not only controls operations of the battery cell 13 and the heater 12, but also controls operations of other elements in the aerosol-generation device 100. For example, the circuit 14 obtains temperature information of the heater 12 sensed by a temperature sensor, and controls the power supplied by the battery cell 13 to the heater 12 according to the information.

Figure 3:
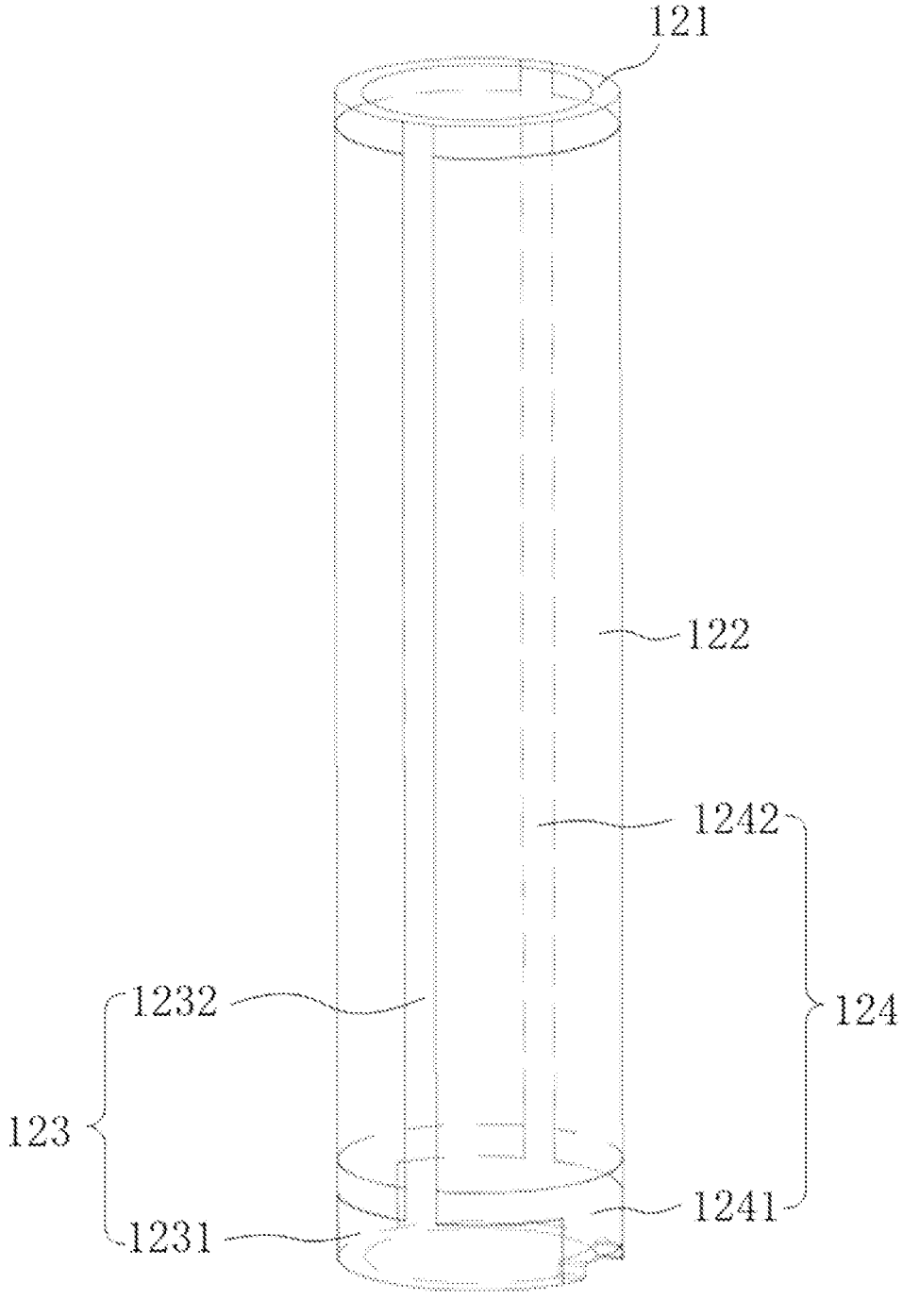
FIG. 3 is a schematic diagram of a heater according to an implementation of this application.

FIG. 3 shows a heater 12 according to an implementation of this application. The heater 12 includes:

a base body 121, constructed as a tube extending along an axial direction of the cavity 11 and surrounding the cavity.

Specifically, the base body 121 includes a first end (or near end) and a second end (or far end), which extend on a surface between the first end and the second end. The base body 121 may be in a shape of a cylinder, a prism, or another column. The base body 121 is preferably in the shape of the cylinder, and a cylindrical hole that runs through the middle of the base body 121 forms at least a part of the cavity. An inner diameter of the hole is slightly greater than an outer diameter of an aerosol-forming article, so that the aerosol-forming article can be placed in the cavity and can be heated.

The base body 121 can be made of high-temperature-resistant and transparent materials such as quartz glass, ceramics or mica, or other materials with high infrared transmittance, such as: high-temperature-resistant materials with an infrared transmittance of more than 95%, which are not limited herein specifically.

An infrared electrothermal coating 122 is formed on the surface of the base body 121. The infrared electrothermal coating 122 may be formed on an outer surface of the base body 121, or may be formed on an inner surface of the base body 121.

The infrared electrothermal coating 122 receives electric power to generate heat, and then generates infrared rays of a certain wavelength, such as: 8 μm to 15 μm far infrared rays. When the wavelength of the infrared rays matches an absorption wavelength of the aerosol-forming substrate, an energy of the infrared rays is easily absorbed by the aerosol-forming substrate. The wavelength of the infrared rays is not limited and may be 0.75 μm to 1000 μm infrared rays, preferably 1.5 μm to 400 μm far infrared rays.

The infrared electrothermal coating 122 preferably includes a far-infrared electrothermal ink, a ceramic powder and an inorganic binder, which are fully stirred and uniformly coated on the outer surface of the base body 121, and then dried and cured for a certain time. A thickness of the infrared electrothermal coating 122 is 30 μm to 50 μm. Certainly, the infrared electrothermal coating 122 may also be coated on the outer surface of the base body 121 by mixing and stirring tin tetrachloride, tin oxide, antimony trichloride, titanium tetrachloride, and anhydrous copper sulfate in a certain proportion; or one of a silicon carbide ceramic layer, a carbon fiber composite layer, a zirconium titanium oxide ceramic layer, a zirconium titanium nitride ceramic layer, a zirconium titanium boride ceramic layer, a zirconium titanium carbide ceramic layer, an iron oxide ceramic layer, an iron nitride ceramic layer, an iron boride ceramic layer, an iron carbide ceramic layer, a rare earth oxide ceramic layer, a rare earth nitride ceramic layer, a rare earth boride ceramic layer, a rare earth carbide ceramic layer, a nickel cobalt oxide ceramic layer, a nickel cobalt nitride ceramic layer, a nickel cobalt boride ceramic layer, a nickel cobalt carbide ceramic layer, or a high silicon molecular sieve ceramic layer; and the infrared electrothermal coating may also be a coating of other materials, for example, derivatives and compounds with carbon as part or all of constituent elements, which include but are not limited to a carbon nanotube, a carbon nanotube film, graphene, a carbon fiber, a carbon fiber film, a carbon film, and carbon fiber cloth.

A conductive element includes a first electrode 123 and a second electrode 124 spaced on the base body 121, and is configured to feed the electric power to the infrared electrothermal coating 122.

At least a part of the first electrode 123 and at least a part of the second electrode 124 are electrically connected to the infrared electrothermal coating 122, so that a current can flow from one electrode to the other electrode via the infrared electrothermal coating 122. Polarities of the first electrode 123 and the second electrode 124 are opposite, for example: the first electrode 123 is a positive electrode, and the second electrode 124 is a negative electrode; or, the first electrode 123 is a negative electrode, and the second electrode 124 is a positive electrode.

In this example, each of the first electrode 123 and the second electrode 124 is a conductive coating. The conductive coating may be a metal coating, a conductive tape, or the like. The metal coating may include silver, gold, palladium, platinum, copper, nickel, molybdenum, tungsten, niobium, or the above metal alloy materials.

In this example, the first electrode 123 and the second electrode 124 are symmetrically arranged along a central axis of the base body 121.

The first electrode 123 includes a coupling electrode 1231 extending along a circumferential direction of the base body 121 and a strip electrode 1232 extending from the coupling electrode 1231 toward the axial direction of the near end. The coupling electrode 1231 does not come into contact with the infrared electrothermal coating 122, and at least a part of the strip electrode 1232 comes into contact with the infrared electrothermal coating 122 to form an electrical connection.

The second electrode 124 includes a coupling electrode 1241 extending along the circumferential direction of the base body 121 and a strip electrode 1242 extending from the coupling electrode 1241 toward the axial direction A of the near end. The coupling electrode 1241 does not come into contact with the infrared electrothermal coating 122, and at least a part of the strip electrode 1242 comes into contact with the infrared electrothermal coating 122 to form an electrical connection.

It can be seen from the above that, the strip electrode 1232 and the strip electrode 1242 are distributed at a uniform distance, which can ensure the uniform heating of the infrared electrothermal coating 122 and improve heating efficiency of a cigarette device. The setting of the coupling electrode 1231 and the coupling electrode 1241 facilitates coupling with the battery cell 13, and avoids the problem that a wire is easily damaged because the wire connected to one end needs to pass through a heating region.

It should be noted that, an infrared transmitter formed by the infrared electrothermal coating 122, the first electrode 123, and the second electrode 124 is not limited to the example in FIG. 3. In other examples, the infrared transmitter may be formed by a thermally excited infrared radiation layer, or by a thin film structure that can be wound on the base body 121, and the like.

It should be further noted that, in other examples, the heater 12 is not limited to an infrared heating mode, and may also be a resistance heating mode, an electromagnetic heating mode, and the like. In addition, the heater 12 is not limited to a circumferential heating mode, and may also be a central heating mode.

Figure 4:
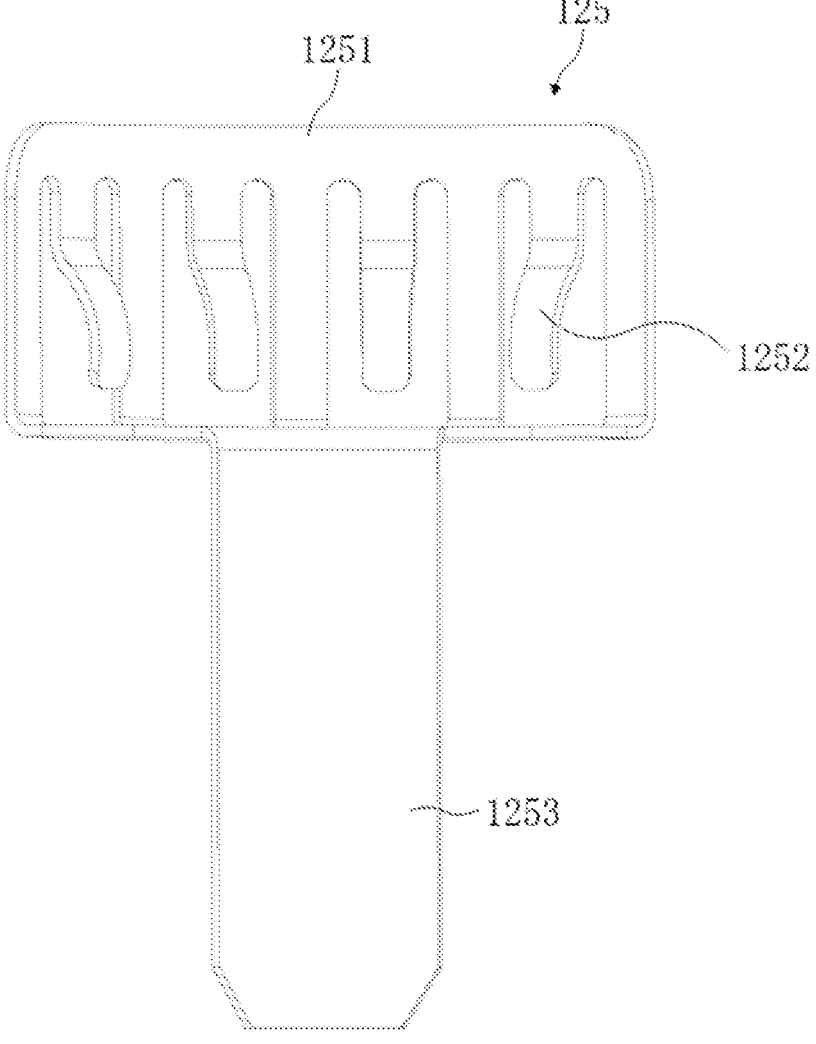
FIG. 4 is a schematic diagram of an electrode connector according to an implementation of this application.

FIG. 4 is a schematic diagram of an electrode connector according to an implementation of this application.

The aerosol-generation device 100 further includes two electrode connectors. The two electrode connectors 125 are electrically connected to the first electrode 123 and the second electrode 124 respectively, and extend the first electrode 123 and the second electrode 124 to positions far away from the base body 121 respectively.

The electrode connector 125 electrically connected to the first electrode 123 is used as an example to explain.

The electrode connector 125 includes a contact portion and an extending portion 1253. The contact portion includes a body 1251 and four arms 1252 formed on the body 1251 in a hollow manner. The four arms 1252 are spaced along the circumferential direction of the base body 121. A quantity of arms 1252 is not limited. When the four arms 1252 abut against the coupling electrode 1231, an elastic force can be generated to realize the electrical connection to the coupling electrode 1231; and the extending portion 1253 extends from the body 1251 toward a position far away from the base body 121, and the extending portion 124 is configured to couple the battery cell 13.

Figure 5:
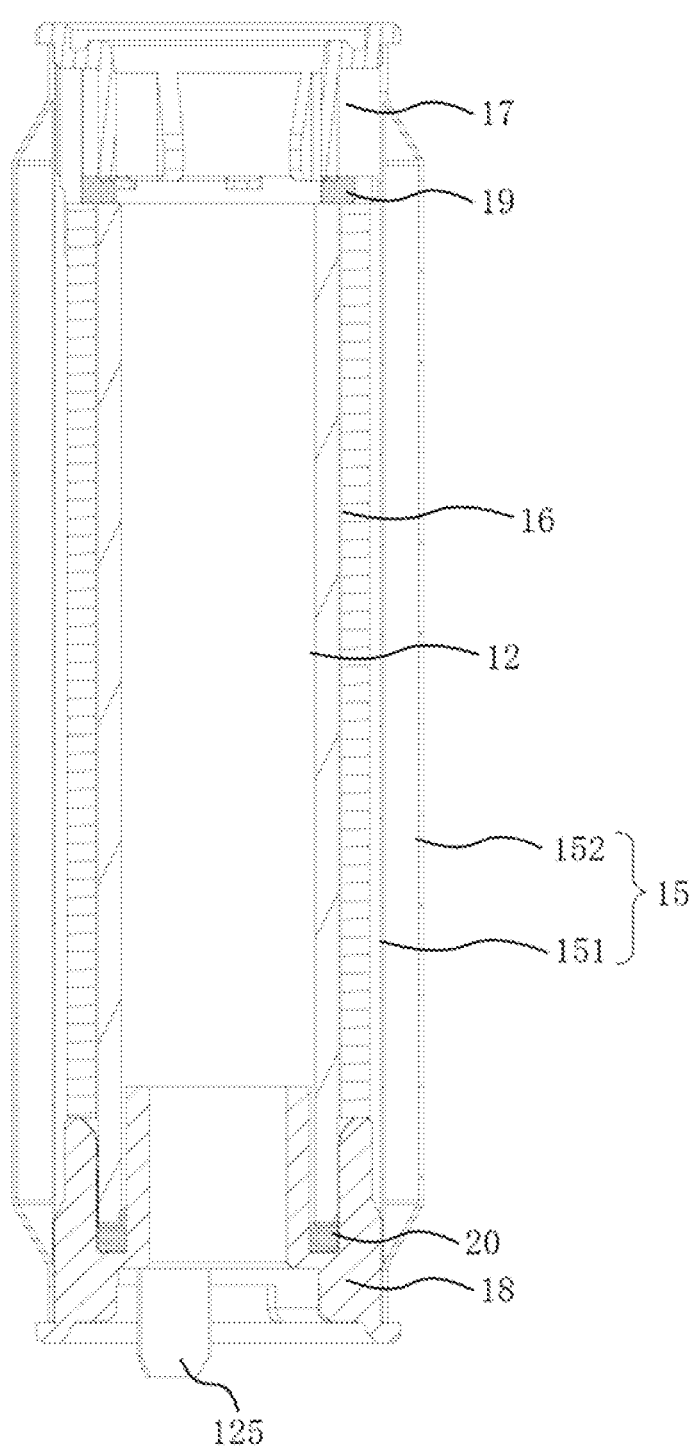
FIG. 5 is a schematic sectional view of an aerosol-generation device after some devices are removed according to an implementation of this application.
Figure 6:
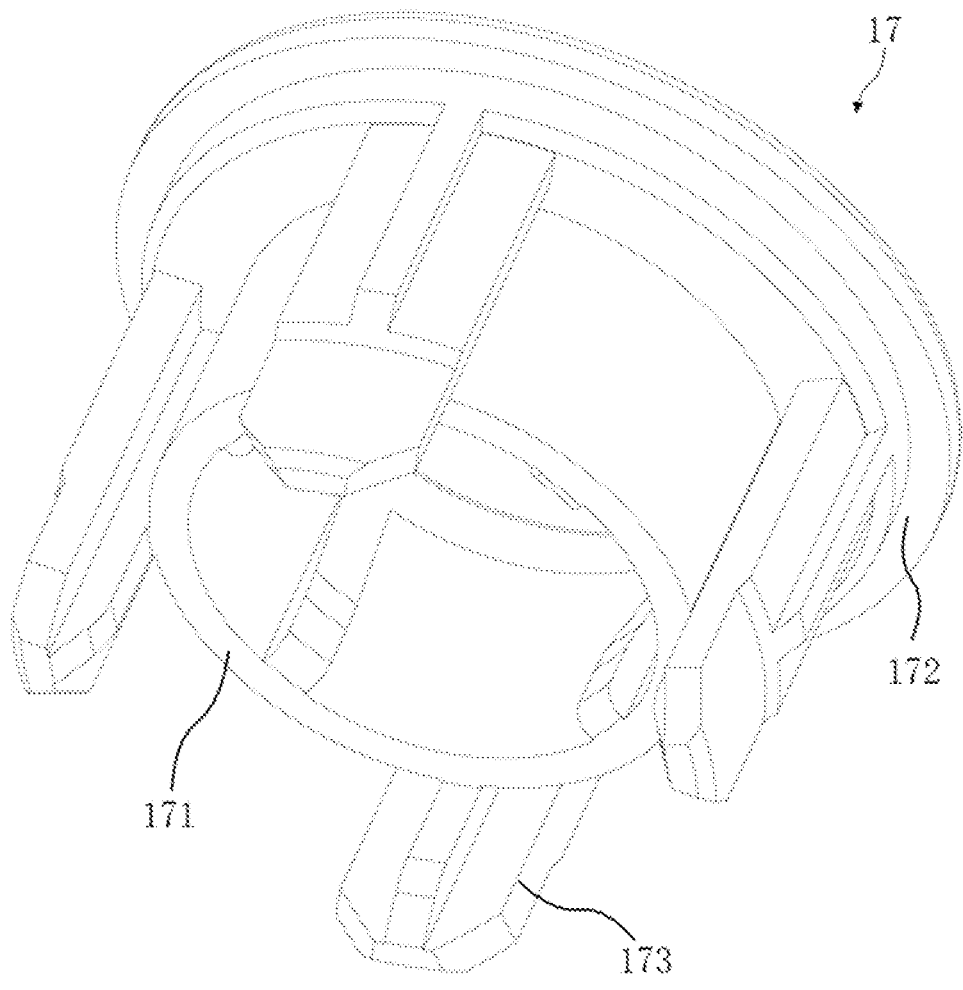
FIG. 6 is a schematic diagram of a first end cap according to an implementation of this application.
Figure 7:
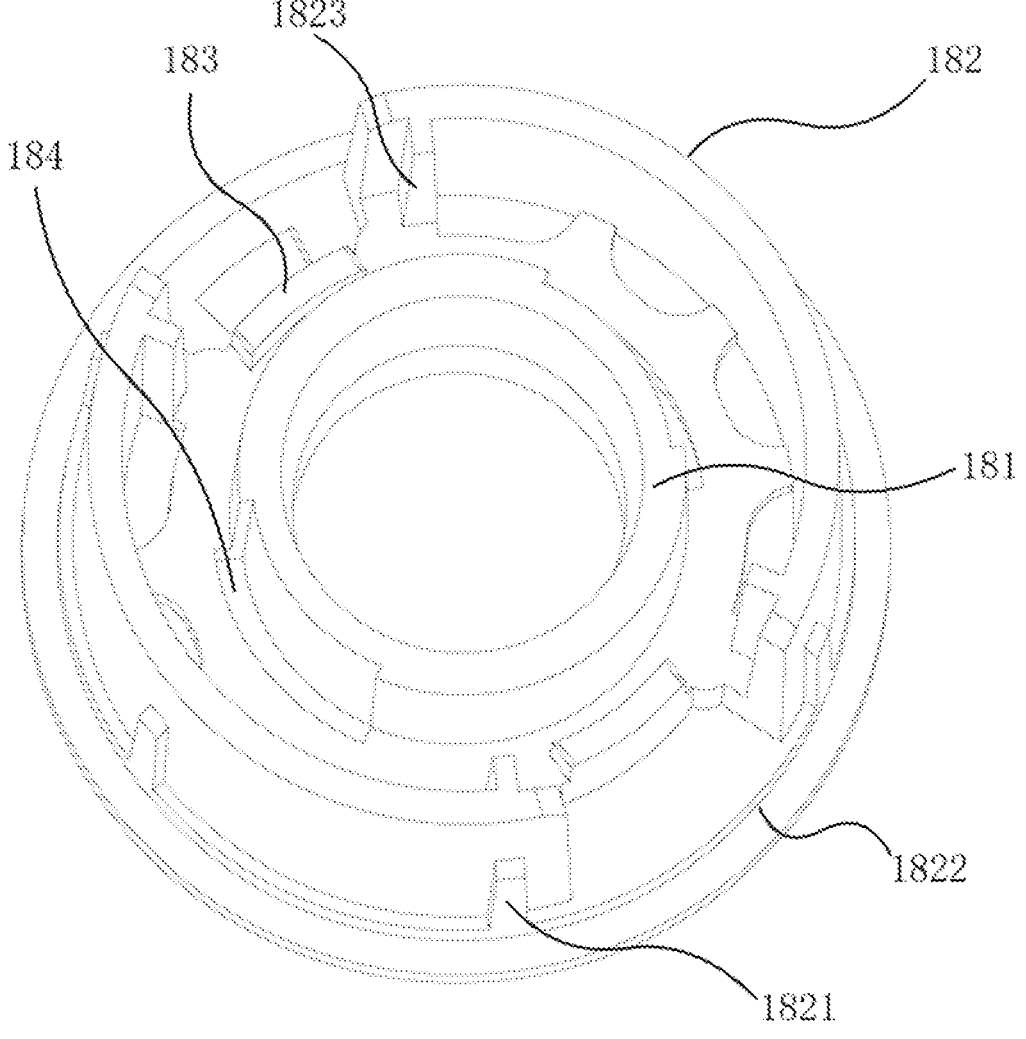
FIG. 7 is a schematic diagram of a second end cap according to an implementation of this application.

Referring to FIG. 5 to FIG. 7, the aerosol-generation device 100 further includes a first end cap 17 sleeved on a first end of the base body 121, a second end cap 18 sleeved on a second end of the base body 121, and a heat insulation tube 15 sleeved outside the base body 121.

The first end cap 17 and the second end cap 18 are made of insulating, high-temperature-resistant and heat-insulating materials.

As shown in FIG. 6, the first end cap 17 includes a hollow tube 171, a protruding portion 172 extending from one end of the hollow tube 171 along a radial direction of the cavity 11, and a retaining portion 173 extending from an axial direction of the protruding portion 172. When the base body 121 is sleeved on the first end cap 17, the retaining portion 173 abuts against the outer surface of the base body 121 to retain a first end portion of the base body 121. An end portion of the heat insulation tube 15 may abut against the protruding portion 172.

As shown in FIG. 7, the second end cap 18 includes an inner cylinder 181 and an outer cylinder 182, and the base body 121 is detachably sleeved between an outer wall of the inner cylinder 181 and an inner wall of the outer cylinder 182.

The inner cylinder 181 is a hollow tube, and an airflow flows through the inner cylinder 181 to at least a part of the cavity formed by the base body 121. A length of the inner cylinder 181 in the axial direction is slightly greater than a length of the coupling electrode 1231 or the coupling electrode 1241 in the axial direction. A plurality of abutting portions 1821 extending toward the heat insulation tube 15 in a circumferential direction are arranged on the outer wall of the outer cylinder 182, and an end portion of the outer cylinder 182 has a protruding portion 1822 extending along the radial direction of the cavity 11. The setting of the abutting portions 1821 and the protruding portion 1822 facilitates assembly with the heat insulation tube 15, so that the end portion of the heat insulation tube 15 can abut against the protruding portion 1822. A plurality of spaced retaining portions 1823 are further arranged on the inner wall of the outer cylinder 182. The retaining portions 1823 extend from the inner wall of the outer cylinder 182 toward the inner cylinder 181. When the base body 121 is sleeved on the second end cap 18, the retaining portions 1823 abut against the outer surface of the base body 121 to retain a second end portion of the base body 121.

A circumferential stop portion for preventing the base body 121 from rotating is further arranged on the second end cap 18. The circumferential stop portion includes a positioning protrusion 183 protruding toward one side of the base body 121 on the second end cap 18. A positioning notch correspondingly matching the positioning protrusion 183 is arranged on tube wall of the base body 121. When the base body 121 is sleeved on the second end cap 18, the positioning protrusion 183 correspondingly matches the positioning notch to prevent the base body 121 from rotating circumferentially relative to the second end cap 18. A through hole 184 for leading out the extending portion 1253 of the electrode connector 125 is further arranged on the second end cap 18.

Further, a first sealing element 19 may be arranged between the first end cap 17 and the first end portion of the base body 121, and a second sealing element 20 may be arranged between the second end cap 18 and the second end portion of the base body 121, which can prevent smoke generated inside the base body 121 from entering a space between the outer surface of the base body 121 and the heat insulation tube 15 and corroding the infrared electrothermal coating 122 and the conductive coatings on the outer surface of the base body 121, thereby improving working reliability of the heater 12.

After the base body 121, the first end cap 17, the second end cap 18, and the heat insulation tube 15 are assembled together, since two ends of the heat insulation tube 15 abut against the protruding portion 172 and the protruding portion 1822 respectively, a roughly sealed enclosed compartment may be formed among the outer surface of the base body 121, the first end cap 17, the second end cap 18, and the heat insulation tube 15. A heat insulation layer 16 may be arranged in the enclosed compartment, to reduce heat of the heater 12 that is transferred to the outside of the aerosol-generation device 100.

In this example, the heat insulation layer 16 includes an aerogel layer wrapped on the outer surface of the base body 121. The aerogel layer can reduce radiation heat transfer of the heater, and the enclosed compartment can reduce air flow inside and outside the enclosed compartment to prevent aerogel powder from falling down. An extension length of a sealing space along the axial direction of the cavity 11 is greater than an extension length of the aerogel layer along the axial direction of the cavity 11. In this way, the sealing space can cover the aerogel layer, which is conducive to heat insulation. Further, a gap between the aerogel layer and the heat insulation tube extends along the axial direction of the cavity 11, which ensures that an aerogel is fluffy and the heat insulation effect is good. In addition, air in the gap can further prevent heat from being transferred to the outside of the aerosol-generation device 100.

The heat insulation tube 15 has an inner tube 151 and an outer tube 152 that are arranged along the radial direction of the cavity 11, and the sealing space is formed between the inner tube 151 and the outer tube 152. The sealing space is filled with gas.

In this example, the gas is at least one of inert gas, air, and carbon dioxide. Carbon dioxide with low thermal conductivity is preferred.

Since gas is sealed between the inner tube 151 and the outer tube 152, there is no need to bear a large pressure difference between the inside and the outside. Therefore, a structural strength requirement of the heat insulation tube 15 may be appropriately reduced compared with an existing vacuum tube, and thicknesses of the inner tube 151 and the outer tube 152 can be reduced by more than one third. For example, a thickness of a common vacuum tube is 0.3 mm; and in this example, the thicknesses of the inner tube 151 and the outer tube 152 may be 0.1 mm, even thinner. The inner tube 151 and outer tube 152 may be made of PEEK (polyether ether ketone), stainless steel, and the like, and stainless steel is preferred.

In this example, a thickness of a tube wall of the inner tube 151 is less than a thickness of a tube wall of the outer tube 152. The thinner inner tube 151 can effectively reduce heat transfer from the middle to the two ends of the heat insulation tube 15, and avoid the problem that the heat insulation effect is not ideal because temperatures at the two ends of the heat insulation tube 15 are too high.

It should be noted that, the specification of this application and the accompanying drawings thereof illustrate preferred embodiments of this application. However, this application may be implemented in various different forms, and is not limited to the embodiments described in this specification. These embodiments are not intended to be an additional limitation on the content of this application, and are described for the purpose of providing a more thorough and comprehensive understanding of the content disclosed in this application. Moreover, the foregoing technical features are further combined to form various embodiments not listed above, and all such embodiments shall be construed as falling within the scope of this application. Further, a person of ordinary skill in the art may make improvements or modifications according to the foregoing description, and all the improvements and modifications shall fall within the protection scope of the attached claims of this application.

What is claimed is:

1. An aerosol-generation device, configured to heat an aerosol-forming substrate to generate an aerosol for inhalation, and comprising:
   a cavity, configured to receive the aerosol-forming substrate;
   a heater, configured to heat the aerosol-forming substrate received in the cavity, the heater having a first end and a second end respectively disposed at two opposite sides of the cavity;
   a heat insulation tube, arranged outside the heater, wherein the heat insulation tube has an inner tube and an outer tube that are arranged along a radial direction of the cavity, and a sealing space is formed between the inner tube and the outer tube; and the sealing space is filled with gas; and
   a first end cap disposed at the first end of the heater, the first end cap comprising a retaining portion extending toward the second end of the heater, the retaining portion abutting against an outer surface of the heater and abutting against an inner surface of the heat insulation tube to be sandwiched between the heater and the heat insulation tube along the radial direction of the cavity;
   a second end cap disposed at the second end of the heater, the second end cap comprising an outer cylinder extending toward the first end of the heater, the outer cylinder abutting against the outer surface of the heater and abutting against the inner surface of the heat insulation tube to be sandwiched between the heater and the heat insulation tube along the radial direction of the cavity;
   a heat insulation layer, arranged between the heater and the heat insulation tube.

2. The aerosol-generation device according to claim 1, wherein the gas is at least one of inert gas, air, and carbon dioxide.

3. The aerosol-generation device according to claim 1, wherein the heater comprises:
   a base body; and
   an infrared transmitter, arranged on a side of the base body, wherein the infrared transmitter is configured to generate infrared rays to radiate and heat the aerosol-forming substrate received in the cavity.

4. The aerosol-generation device according to claim 1, wherein an enclosed compartment is formed between the heater, the heat insulation tube, the first end cap, and the second end cap, and the heat insulation layer is arranged in the enclosed compartment.

5. The aerosol-generation device according to claim 4, wherein the first end cap has a first protruding portion extending along the radial direction of the cavity, and the second end cap has a second protruding portion extending along the radial direction of the cavity; and
   the two ends of the heat insulation tube abut against the first protruding portion and the second protruding portion respectively.

6. The aerosol-generation device according to claim 5, further comprising a first sealing element and a second sealing element, wherein:

the first sealing element is arranged between one end of the heater and the first end cap, and the second sealing element is arranged between an other end of the heater and the second end cap.

7. The aerosol-generation device according to claim 1, wherein the heat insulation layer comprises an aerogel layer wrapped outside the heater.

8. The aerosol-generation device according to claim 7, wherein an extension length of the sealing space along an axial direction of the cavity is greater than an extension length of the aerogel layer along the axial direction of the cavity.

9. The aerosol-generation device according to claim 7, wherein a gap extending along the axial direction of the cavity is arranged between the aerogel layer and the heat insulation tube.

10. The aerosol-generation device according to claim 1, wherein a thickness of a tube wall of the inner tube is less than a thickness of a tube wall of the outer tube.

11. The aerosol-generation device according to claim 10, wherein the gas is at least one of inert gas, air, and carbon dioxide.

12. The aerosol-generation device according to claim 10, wherein the heater comprises:

a base body; and an infrared transmitter, arranged on a side of the base body, wherein the infrared transmitter is configured to generate infrared rays to radiate and heat the aerosol-forming substrate received in the cavity.

13. The aerosol-generation device according to claim 10, wherein at least one of the thickness of the inner tube and the thickness of the outer tube is equal to or less than 0.1 mm.

14. The aerosol-generation device according to claim 10, wherein an enclosed compartment is formed between the heater, the heat insulation tube, the first end cap, and the second end cap, and the heat insulation layer is arranged in the enclosed compartment.

15. The aerosol-generation device according to claim 14, wherein the first end cap has a first protruding portion extending along the radial direction of the cavity, and the second end cap has a second protruding portion extending along the radial direction of the cavity; and the two ends of the heat insulation tube abut against the first protruding portion and the second protruding portion respectively.

16. The aerosol-generation device according to claim 15, further comprising a first sealing element and a second sealing element, wherein:

the first sealing element is arranged between one end of the heater and the first end cap, and the second sealing element is arranged between an other end of the heater and the second end cap.

17. The aerosol-generation device according to claim 10, wherein the heat insulation layer comprises an aerogel layer wrapped outside the heater.

18. The aerosol-generation device according to claim 17, wherein an extension length of the sealing space along an axial direction of the cavity is greater than an extension length of the aerogel layer along the axial direction of the cavity.

19. The aerosol-generation device according to claim 17, wherein a gap extending along the axial direction of the cavity is arranged between the aerogel layer and the heat insulation tube.

* * * * *